Aug. 18, 1964 J. C. SUITS ETAL 3,145,372
MAGNETOSTRICTIVE THIN FILM DELAY LINE
Filed Aug. 27, 1962

INVENTORS
JAMES C. SUITS
ARTHUR M. YELON
BY [signature]
ATTORNEY

United States Patent Office 3,145,372
Patented Aug. 18, 1964

3,145,372

MAGNETOSTRICTIVE THIN FILM DELAY LINE

James C. Suits, Mount Kisco, and Arthur M. Yelon, Yorktown Heights, N.Y., assignors to International Business Machines Corporation, New York, N.Y., a corporation of New York Filed Aug. 27, 1962, Ser. No. 219,656
8 Claims. (Cl. 340—174)

This invention relates to a magnetostrictive delay line, and, more specifically, to a delay line employing a biaxial anisotropic thin magnetic film to which succeeding mechanical waves of tension and compression are applied to propagate information, in the form of a domain wall, along the longitudinal axis of the film.

Since the onset of magnetic thin film technology, the anticipated reduction of fabrication costs with the added benefits of high speed switching and compact packaging has caused an abundance of research directed primarily to the use of magnetic thin films to replace ferrite cores in a magnetic core memory having the attributes of coincident current selection. As with the case of ferrite core memories, magnetostrictive delay lines have long been recognized as having many desirable attributes for use in data processing equipment and, in some instances, due to cost considerations, have been more profitably employed in small low cost data handling machines.

With the above considerations in view, a magentostrictive delay line has been proposed in a copending application Serial No. 219,585, filed in behalf of John E. Lovell and assigned to the assignee of this application, wherein an elongated planar uniaxial anisotropic magnetic thin film is employed. In this copending application, the single easy axis of the film is transverse with respect to its longitudinal axis and the film composition is controlled to exhibit either positive or negative magnetostriction, when subjected to mechanically applied waves of tension and compression, the film will exhibit an induced longitudinal and transverse anisotropy of sufficient magnitude to orient the magnetization of the film in the direction of the induced anisotropy. The direction of orientation along the longitudinal axis of the film is controlled by input means coupled to the film at one end and the difference of direction is employed to connote different binary values which are detected on a polarity basis by an output circuit coupled to the film at another end of the film. In order to permanently store the information in the magnetic film, means are provided for decoupling the film from the mechanical waves of tension and compression.

It has been found, however, that when a uniaxial anisotropic film is employed, the magnitude of the mechanical waves of tension and compression required for a sufficient induced anisotropy in the film to cause propagation of its magnetization along the longitudinal axis of the film is too large, encouraging deleterious switching operations. By employing a biaxial anisotropic thin magnetic film, the composition and characteristic of the film may be adjusted so that a larger magnitude of induced anisotropy is obtained for a given mechanical stress, alleviating the problem with respect to uniaxial thin films. For an understanding of the nature of biaxial anisotropic thin magnetic films and their fabrication, reference is made to a copending application, Serial No. 102,184, filed April 11, 1961, in behalf of Emerson Pugh, now U.S. Patent No. 3,071,756, which is also assigned to the assignee of this application.

Accordingly, it is a prime object of this invention to provide an improved magnetostrictive delay line.

Another object of this invention is to provide an improved magnetostrictive delay line employing an elongated biaxial anisotropic magnetic thin film.

Still another object of this invention is to provide an improved magnetostrictive delay line employing an elongated biaxial anisotropic magnetic thin film to which alternate waves of mechanically induced longitudinal and transverse anisotropy are applied to nucleate a Néel wall.

The foregoing and other objects, features and advantages of the invention will be apparent from the following more particular description of a preferred embodiment of the invention, as illustrated in the accompanying drawings.

Figure 2:
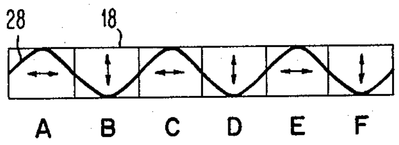
FIG. 2 is a hypothetical illustration of the effect of an induced mechanical wave applied to the delay line of FIG. 1.

FIGS. 3*a*–3*f* illustrate a conception of information propagation in the delay line of FIG. 2.

Figure 1:
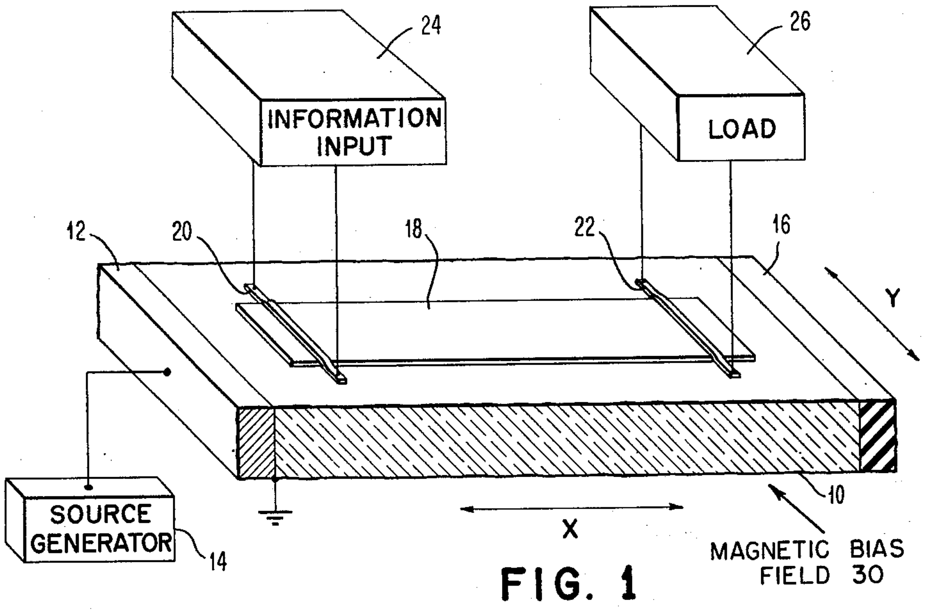
FIG. 1 is a schematic illustration of a magnetostrictive delay line according to an embodiment of this invention.

Referring to FIG. 1 there is provided a suitable non-magnetic substrate member 10, made of single crystal or fused quartz material which has a characteristic of compressing and expanding in response to acoustical signals applied thereto with a minimum amount of attenuation. That is, with respect to the longitudinal axis of the substrate member 10, here defined by an arrowed X axis, the material of member 10 expands and contracts with respect to the longitudinal X axis in response to acoustical waves applied thereto by means of an acoustical transducer 12. The acoustical transducer 12 is connected at one end of the member 10 and connected to a source generator 14. At the opposite end of substrate member 10 an absorbing medium 16 is provided for absorbing any strain or stress of the substrate member 10. It should be understood that instead of the absorbing medium 16, the substrate 10 could be tapered at this end and the effect would be the same. Deposited on one surface of the member 10 is a biaxial anisotropic magnetic thin film 18 exhibiting a first easy axis of magnetization directed along the X axis and a second easy axis of magnetization directed along a transverse axis of the member 10 indicated by an arrowed axis line Y. The magnetic film 18 may be provided by any one of the methods described in the cited copending application Serial No. 102,184. The magnetic material of film 18 is an alloy of nickel-iron comprising approximately 85% Ni and 15% Fe, or 75% Ni and 25% Fe by weight. The particular composition of ferromagnetic material is chosen so that the film 18 may exhibit negative magnetostriction, (85% Ni–15% Fe) or positive magnetostriction (75% Ni–25% Fe).

Positive magnetostriction may be defined as that property of a magnetic material, such as film 18, when subjected to a mechanical tension and compression along its longitudinal axis, to exhibit a mechanically induced tension anisotropy directed along the direction of longitudinal stress and to exhibit a mechanically induced compression anisotropy directed transverse to the longitudinal direction of compression. Negative magnetostriction may be defined as that property of a magnetic material, when subjected to a mechanical tension and compression along its longitudinal axis, here the X axis, to exhibit a mechanically induced compression anisotropy directed along the longitudinal axis of compression, and to exhibit a mechanically induced expansion anisotropy transverse to the direction of longitudinal tension, here the Y axis. For more details with respect to the difference in magnetostriction, reference may be made to a book entitled, "Ferromagnetism" by Richard Bozorth, published by the D. Van Nostrand Company, Inc., copyrighted and first published in 1951, and reprinted in 1953 and 1955. Thus, assuming the film 18 exhibits positive magnetostriction, when the member 10 is compressed, the direction of mechanically induced compression anisotropy of film 18 will be along the transverse Y axis and when the substrate member 10 is under tension, i.e., expansion, the direction of mechanically induced expansion anisotropy of the film 18 will be along the longitudinal X axis. The medium 10 and hence, the film 18 which is coupled thereto will undergo tension, and compression in response to acoustical waves provided by source generator 14 through transducer 12.

An input conductor 20 and an output conductor 22 is provided coupling the film 18 at opposite ends. The input conductor 20 is connected to an information signal input means 24 while the output conductor 22 is connected to a load 26.

Referring to FIG. 2, the magnetic film 18 is hypothetically shown as defining six zones labelled A–F. Superimposed upon the film 18 is a curve 28 representing, at a given instant, an acoustical wave in the member 10 which is of sinusoidal form similar to the signals provided by source generator 14 and having a given frequency (*fo*). The acoustical wave may be considered as providing a series of tension and compression waves which cause an induced longitudinal anisotropy in the portions A, C and E of film 18 aligned along the X axis as indicated, and an induced transverse anisotropy in the portions B, D and F aligned along the Y axis as indicated. The direction of the induced anisotropy indicated in portions B, D and F may take place due to compression when the film 18 exhibits positive magnetostriction. If the film 18 exhibits negative magnetostriction, then the mechanically induced compression anisotropy would be aligned along the longitudinal axis of the film similar to that illustrated for portions A, C and E, while the direction of mechanically induced tension ansiotropy would be aligned transverse to the longitudinal axis of the film 18, similar to that illustrated for the zones B, D and F.

The acoustical wave provided in substrate member 10 by energization of transducer 12 by source 14, is controlled so that the mechanically induced anisotropy, is sufficient, of and by itself, to cause rotation of the magnetization of any one hypothetical zone from orientation along either the second or first easy axis of film 18 to orientation along the other easy axis.

Assume that the film 18 exhibits positive magnetostriction and during a time when the first portion of the film 18, say zone A, is subjected to tension, the signal input 24 energizes input conductor 20 so as to apply a magnetic field to the zone A of film 18 along the first easy axis directed toward the right. This field is controlled to be of a magnitude which is insufficient, of and by itself, to cause rotation of the magnetization of the material 18 coupled, zone A, from the second easy axis to the right and orientation along the first easy axis. The field applied by energization of input conductor 20 does dictate the direction of orientation of the zone A. Coincidence of the induced longitudinal anisotropy due to the mechanical tension of the material of zone A, causes rotation of the magnetization of zone A from orientation along the second easy axis to orientation along the first easy axis toward the right as indicated in FIG. 3*a*.

Figure 3A:
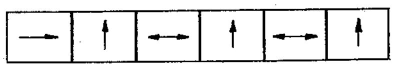

Referring to FIG. 3*a*, the magnetization of zones B, D, and F are shown directed along the second easy axis of film 18 in a similar direction; the magnetization of zones A, C and E is shown directed to the right for zone A and either directed to the right or left in zones C and E. The direction of magnetization of film 18 is maintained in a similar direction along the second easy axis by employing a magnetic bias 30, due to the earth's field, in the plane of the film transverse with respect to the longitudinal X axis. The magnetic bias 30 could preferably be maintained by use of a Helmholtz coil. Since the mechanical force coupled to the film 18 is provided by sonic waves travelling from one extremity of the film to the other, so too, the wave 28 moves toward the right at a predetermined speed. FIGS. 3*b*–3*f* denote the magnetization of the different zones A–F for each sequential half wave period of 28.

Figure 3B:
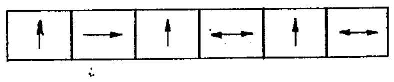
Figure 3C:
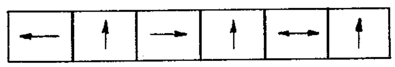
Figure 3D:
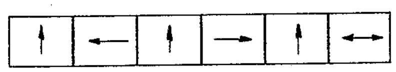

FIG. 3*b* illustrates the magnetization of film 18 when the zones A, C and E are subjected to mechanical tension or compression so as to exhibit an induced transverse anisotropy directed along the second easy axis of the film while the zones B, D and F exhibit induced longitudinal anisotropy directed along the first easy axis of the film. The magnetization of zone B is established along the first easy axis of film 18 due to the induced longitudinal anisotropy and directed to the right due to the magnetic bias provided by the magnetization of zone A as shown in FIG. 3*a* to the zone B. When the portions A, C and E are next subjected to mechanical stress and exhibit an induced longitudinal anisotropy a different binary value may be inserted in the circuit by the means 24 energizing the conductor 20 to apply a longitudinal field to the film 18 directed to the left. The coincidence of the signal input field and the induced longitudinal anisotropy cause the magnetization of zone A to be established along the first easy axis of the film 18 directed to the left. The FIG. 3*d* shows that the magnetization of zones A and C in FIG. 3*c* is moved to the right and now occupies zones B and D.

Figure 3E:
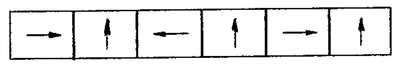
Figure 3F:
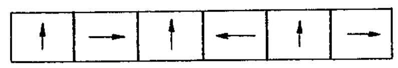

When the zones A, C and E are next subjected to an induced longitudinal anisotropy, the signal input field provided by energization of conductor 20 by means 24 may be directed to the left or right, depending upon the binary value represented thereby. Assume that the binary value to be here represented is the same as that defined by zone A in FIG. 3*a*. The signal input field is then directed to the right. The magnetization of zone A in FIG. 3*e* is then established along the first easy axis of film 18 due to the mechanically induced longitudinal anisotropy and is directed to the right due to the direction of the signal input field. At this time, the magnetization of zones A–E in FIG. 3*d* has been shifted to the right. During the next half-cycle period, as the mechanical wave is propagated along the longitudinal axis of film 18, the magnetization of zones A–E is propagated to the right as is shown in FIG. 3*f*.

At this point, it is believed appropriate to consider in some detail, the orientation of magnetization vectors within the different zones. Although the total magnetization of any zone such as zone A in FIG. 3*a* is shown directed to the right along the X axis, what takes place is that the magnetization vectors within this zone point to the right in that portion of the material where the mechanical wave is maximum and succeedingly deviates from this position to the Y axis. This transition of the magnetization within a zone is a domain wall and is propagated along the film 18, from zone to zone, as the mechanical wave, due to the acoustical signal passing through member 10 from transducer 12 to absorbing medium 16, is applied to each succeeding portion of the film 18 as is shown in FIGS. 3*b*–3*f*. This domain wall takes the form of a Néel wall, as opposed to a Bloch wall. The difference between Néel walls and Bloch walls is well understood by those versed in the art and is also described by Bozorth op. cit. With respect to the probability of Néel walls or Bloch walls being created and supported in a magnetic material of specified thickness, reference is made to an article entitled, "Remarks on the Theory of Magnetic Properties of Thin Flms and Fine Grains" by Louis Néel, appearing in the Journal of Physics Radium, vol. 17, No. 3 (1956). Simply, a Néel wall may be considered as one in which the magnetization vectors between adjacent areas of magnetization are rotated in the same plane, such as the plane of the film 18, while for Bloch walls, these vectors rotate out of this plane. That is, with respect to the plane of film 18, the magnetization vectors for a Bloch wall would be rotated out of the plane of the film to a direction perpendicular with its plane. A further explanation of the movement of a Néel wall and its form with respect to a Bloch wall is provided by reference to an article entitled, "Proposal for Magnetic Domain Wall Storage and Logic," by D. O. Smith, IRE Transactions on Electronic Computers, vol. EC–10, No. 4, pages 708–711, December 1961.

It may be seen, therefore, that binary information may be entered into the circuit of FIG. 1 during each portion of the mechanical wave to the portion of film 18 coupled by input conductor 20 which provides an induced longitudinal anisotropy. As this portion of the film 18 coupled by input conductor 20 exhibits the induced longitudinal anisotropy, the input conductor 20 is energized either positively or negatively to initiate a Néel wall, which is then propagated along the member 10. The different binary values are indicated by the direction of magnetization along the first easy axis of film 18. Thus, as a magnetization of each zone is transferred to the right as the mechanical wave propagates, the output conductor 22 distinguishes the different binary values on a polarity basis. That is, with respect to zone F of FIG. 3*e* as the magnetization changes as shown in FIG. 3*f*, the deviation is clockwise, however, as between the zones E and D in FIG. 3*f*, the change in magnetization is counterclockwise. Hence, the flux change experienced by output conductor 22 is either a positive or negative deviation.

The circuit of FIG. 1 functions as a delay line in that information is put into the circuit and at some defined interval of time is available at its output. In order to store the information, the information could be circulated by providing a closed loop arrangement, such as coupling the output conductor 22 back to the input conductor 20.

While the invention has been particularly shown and described with reference to a preferred embodiment thereof, it will be understood by those skilled in the art that various changes in form and details may be made therein without departing from the spirit and scope of the invention.

What is claimed is:

1. An information control circuit comprising:

an elongated planar biaxial anisotropic thin magnetic film having a first easy axis of remanent flux orientation transverse with respect to the longitudinal axis thereof and a second easy axis of remanent flux orientation along the longitudinal axis of said film;

said film exhibiting a first mechanically induced anisotropy directed along the first easy axis of said film and a second mechanically induced anisotropy directed along the second easy axis of said film in response to mechanical tension and compression applied along its longitudinal axis, first means coupled to said film for propagating alternate stresses of compression and tension along the longitudinal axis of said film having a magnitude sufficient to orient the magnetization of each portion stressed along the first or second axis of induced anisotropy;

means for applying a magnetic bias field in the plane of said film directed along the first easy axis, coincidently operative, when any portions of said film exhibits said first mechanically induced anisotropy, to establish said portions in a datum stable state of magnetization along the first easy axis; and circuit means coupled to different portions of said film for entering and providing an output for a binary value comprising;

an input circuit coupling a first portion of said film, operative when said first portion exhibits said second mechanically induced anisotropy, for applying a field directed along the second easy axis thereof to conjointly establish said first portion in one or an opposite stable state along said second easy axis to thereby define different binary values.

2. The circuit of claim 1, wherein said circuit means includes an output circuit coupling a different portion of said film in alignment with the first easy axis thereof.

3. The circuit of claim 1, wherein said film exhibits negative magnetostriction.

4. The circuit of claim 1, wherein said film exhibits positive magnetostriction.

5. A magnetostrictive delay line comprising:

an elongated planar, biaxial anisotropic thin magnetic film having a first easy axis of remanent flux orientation transverse with respect to its longitudinal axis and a second easy axis of remanent flux orientation along its longitudinal axis;

said film exhibiting a first mechanically induced anisotropy directed along the first easy axis of said film and a second mechanically induced anisotropy directed along the second easy axis of said film in response to mechanical tension and compression applied along its longitudinal axis;

said film affixed to a planar, non-magnetizable, substrate member which is responsive to acoustical signals applied along its longitudinal axis to expand and contract along the same axis;

first means for applying acoustical signals along the longitudinal axis of said substrate member having a sufficient magnitude to orient the magnetization of said film along the axis of said first and second mechanically induced anisotropy;

input circuit means coupling a first portion of said film and operative when said first portion exhibits said second mechanically induced anisotropy for applying a magnetic field directed along the second easy axis of said film to conjointly establish the magnetization of said first portion in one or an opposite stable along said second easy axis to thereby define different binary values;

biasing means operative on any portion of said film which exhibits said first mechanically induced anisotropy for applying a biasing field to said film along the first easy axis to conjointly establish the magnetization thereof in a datum stable state along said first easy axis, and output circuit means coupling a portion of said film remote from said first portion for providing an induced voltage output indicative of the binary values entered by said input means.

6. The delay line of claim 5, wherein said output circuit means couples said film in alignment with the first easy axis.

7. The delay line of claim 6, wherein said film exhibits positive magnetostriction.

8. The delay line of claim 6, wherein said film exhibits negative magnetostriction.

No references cited.